Dec. 23, 1941.  J. H. O'NEIL  2,266,792
SOLDER SPLASH SHIELDING MEANS
Filed Dec. 16, 1939  3 Sheets-Sheet 2
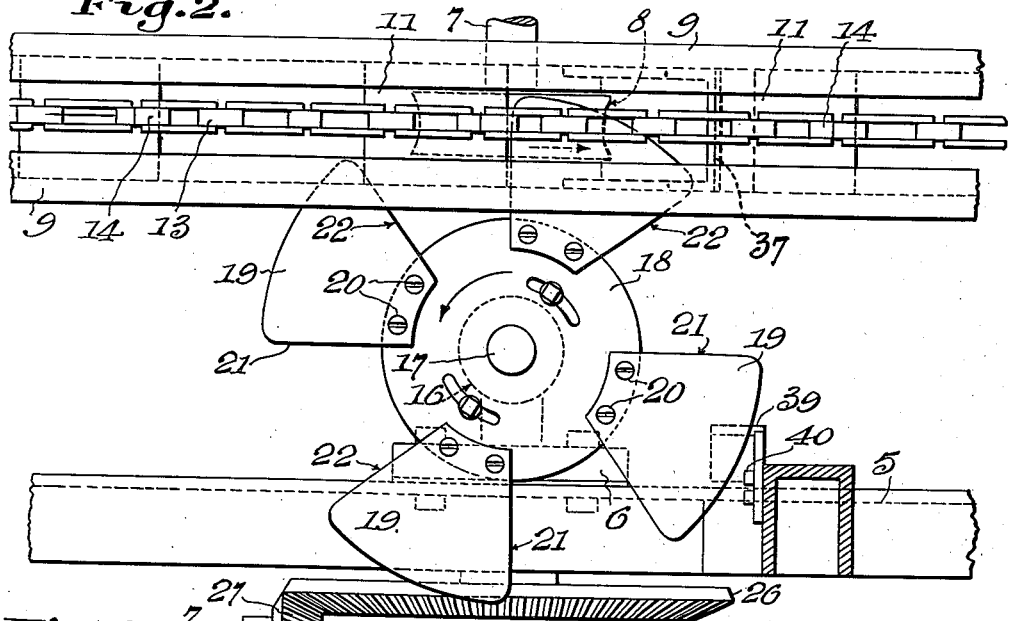
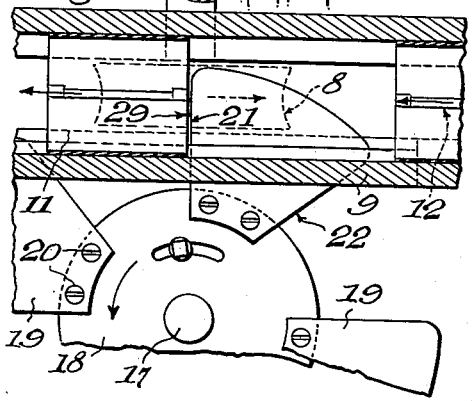
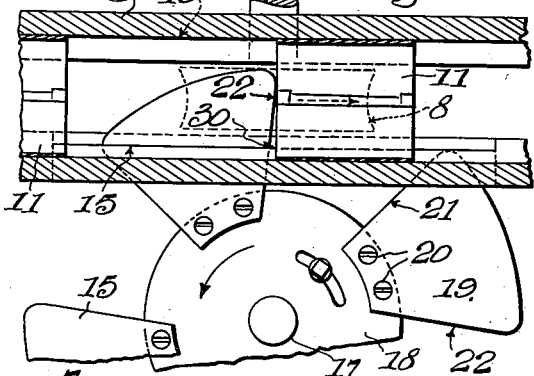
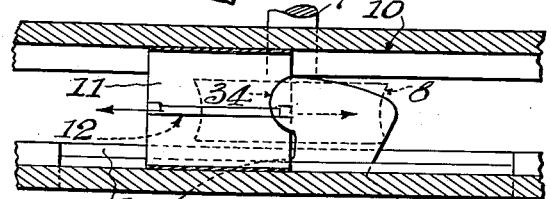
Inventor
James H. O'Neil
By Mason & Porter
Attorneys Dec. 23, 1941.  J. H. O'NEIL  2,266,792
SOLDER SPLASH SHIELDING MEANS
Filed Dec. 16, 1939  3 Sheets-Sheet 3
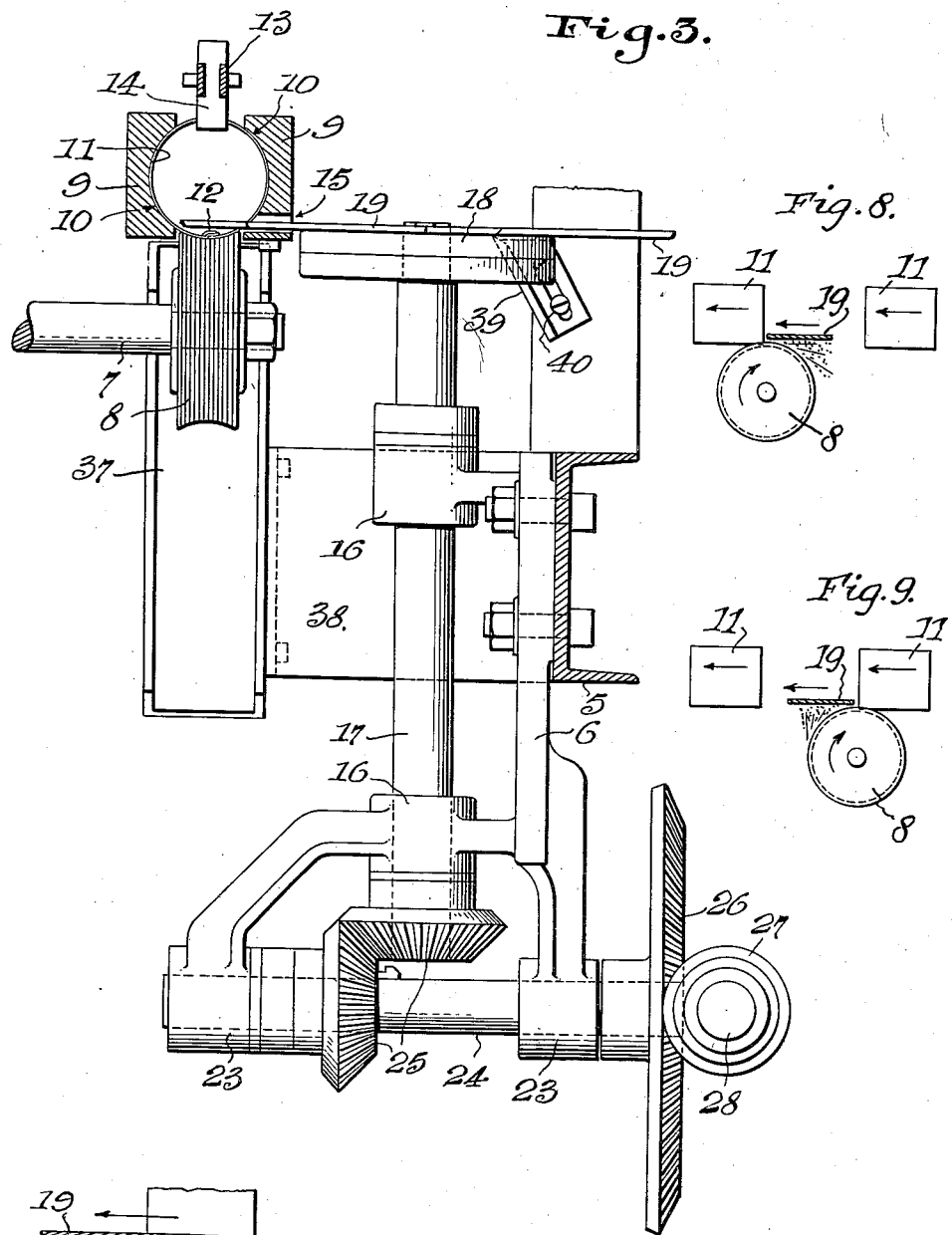
Inventor
James H. O'Neil
By Mason & Porter
Attorneys Patented Dec. 23, 1941

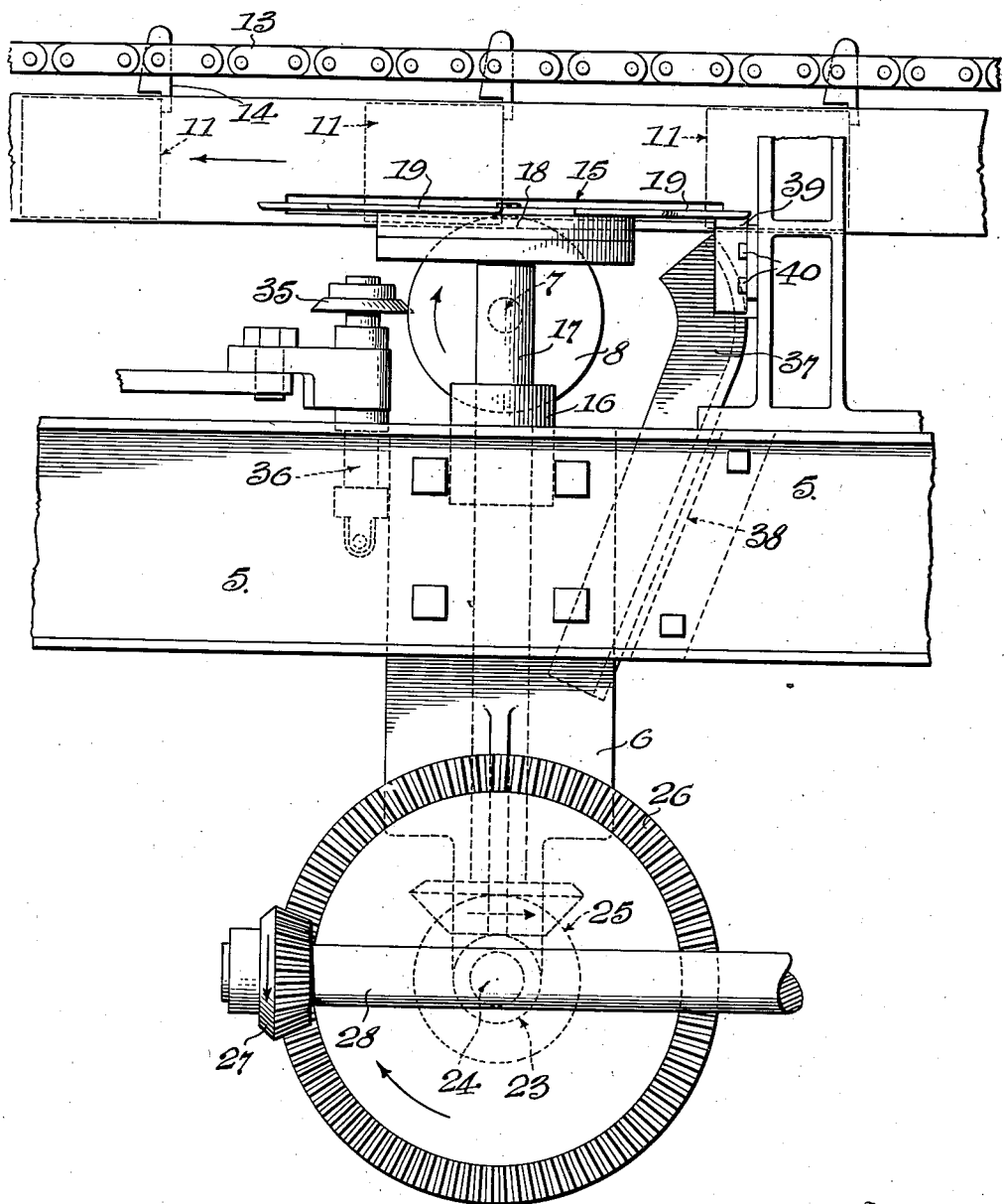

2,266,792

UNITED STATES PATENT OFFICE 2,266,792

SOLDER SPLASH SHIELDING MEANS

James H. O'Neil, Syracuse, N. Y., assignor to Continental Can Company, Inc., New York, N. Y., a corporation of New York Application December 16, 1939, Serial No. 309,671

7 Claims. (Cl. 113—97)

The invention relates generally to apparatus for making can bodies and primarily seeks to provide novel means for shielding the open ends of the formed can bodies, as they are rapidly moved along in spaced relation in the body maker following the seam soldering operation, against splashing of molten solder bits thrown off by the rapidly rotating solder wiping roll.

In the making of can bodies, body blanks are customarily shaped cylindrically about a forming horn and have their meeting edges hooked together in the form of a longitudinal seam which is secured by a bumping pressure against said horn. Following the formation of this side seam the can bodies are rapidly fed along in longitudinally spaced relation, usually by a feeder lug equipped chain, and while being so fed the side seams are contacted by a soldering roll which rotates beneath the can bodies about an axis disposed parallel the line of feed. Following the soldering of the can body seams a wiper roll rapidly rotating about a horizontal axis disposed transversely of the line of feed contacts the solder side seams of the rapidly moving can bodies for the purpose of removing excess solder. As the trailing edge of each rapidly moving can body passes over the wiping roll, there is a tendency for this roll to throw off a spatter of molten solder bits and these bits of solder fly into the open ends of the cans, particularly into the oncoming open end of the next succeeding can body, and adhere to the internal surface thereof.

This spattering or splashing of solder is obviously objectionable because the solder pellets adhere to the interior of the can bodies, often become detached during filling of the cans, and when adhered to lacquered or enameled internal coatings of can bodies, these hot solder bits discolor and sometimes destroy portions of the protective coatings, and corrosion sometimes results. It is, therefore, a purpose of the present invention to provide means for preventing this spattering of solder into the open ended cans as they are being fed along in the body making machine.

In its more detailed nature the invention resides in the provision of a rotary disk-like member carrying individual, radially projected shield-members or segments which move into the spaces intervening successive spaced can bodies as they approach a location over the wiping roll axis thereby to intercept the spattering solder and prevent its entry into the interiors of the can bodies.

Another object of the invention is to provide a novel shielding disk of the character stated which rotates in a horizontal plane about a vertical axis and projects its shielding segments one by one through a lateral opening formed in the usual solder horn or horse.

Another object of the invention is to provide a novel means for scraping the shielding segments to prevent accumulation of solder thereon.

With these and other objects in view which will more fully appear, the nature of the invention will be more clearly understood by following the description, the appended claims, and the several views illustrated in the accompanying drawings.

In the drawings:

Figure 1 is a somewhat diagrammatic side elevation illustrating the invention applied to a body making apparatus.

Figure 2 is a plan view of the parts illustrated in Figure 1.

Figure 3 is a vertical cross section taken across the feed line at the position of the shielding disk.

Figure 4 is a detailed horizontal section illustrating the position of a shielding segment when the trailing end of a can body is disposed over the axis of the wiper roll.

Figure 5 is a view similar to Figure 4 and illustrates the position of a shielding segment when the leading end of a can body is disposed over the axis of the wiper roll.

Figure 6 is a fragmentary sectional view illustrating the scraping means for removing accumulation of solder from the under surface of the shielding segments.

Figure 7 is a plan view illustrating a shielding disk embodying a modified shape of shielding segment.

Figures 8 and 9 are diagrammatic side views respectively illustrating the solder splashing effect during the passing of the trailing and leading ends of can bodies over the wiper roll.

In the example of embodiment of the invention herein illustrated, there are shown only fragments of a body making machine, namely, fragments of the outside horn or horse along which the can bodies are fed from the forming horn through the soldering and wiping stations, a fragment of the can body feeding chain, the wiping roll, and frame portions. It is to be understood that the solder splash shielding means forming the basis of the invention herein disclosed can be applied to various forms of body makers.

A portion of the machine framing is indicated at 5, and a bearing bracket 6 is affixed to this frame portion in alignment with the axis of the horizontally disposed shaft 7 upon which the usual felt wiper roll 8 is mounted. The roll 8 is rotatable in a vertical plane beneath the usual outside horn or horse composed of laterally spaced guide members 9 having their opposed faces shaped to form a cylindrical guideway 10 for the can bodies 11 which include the usual longiudinal side seams 12 to which molten solder has been applied during passage of the can bodies over the well known soldering roll (not shown).

The can bodies may be moved along the horn in equidistantly spaced relation by any approved means, and in this illustration I have included a fragment of the usual conveyor chain 13 equipped with depending can body engaging drive lugs 14.

The horn half member 9 at the side at which the shielding means is mounted is longitudinally slotted as at 15, and the solder splash shielding means hereinafter described in detail is operable through this slotway.

The bracket 6 carries a pair of vertically aligned bearings 16 in which a shaft 17 is rotatably mounted. A disk head 18 is secured upon the upper end of the shaft 17, and a plurality of equidistantly spaced shield members or segments 19 radially project from the disk head and are removably secured thereon as at 20. Each segment 19 includes a leading edge portion 21 and a trailing edge portion 22, and these edge portions 21 and 22 converge toward the axis of the disk head.

The bracket 6 also includes horizontally aligned bearings 23 which rotatably support a shaft 24 connected in driving relation with the vertical shaft 17 by a bevel gear couple 25. The horizontal shaft 24 also carries a large bevel gear 26 to which rotation is imparted by a bevel pinion 27 secured upon a driver shaft 28 which is driven in any suitable manner (not shown) in timed relation with the can body conveying chain 13 so that the solder splash shielding segments 19 will be successively presented through the horn slotway 15 into the spaces intervening the ends of the traveling can bodies in the manner clearly illustrated in Figures 2, 4 and 5 of the drawings.

It will be observed by reference to Figures 4 and 5 of the drawings that the leading edge 21 of each shielding segment 19 is disposed truly radially with respect to the disk head 18 whereas the trailing edge 22 of each said segment is acutely angled with respect to a radial of the disk head. By thus shaping the edge portions of the segments, the leading edge of each segment will be disposed closely adjacent to and parallel the trailing end of a can body, as at 29, while that can body is passing over the axis of the wiper roll 8 in the manner illustrated in Figure 4 of the drawings. The acutely angled relation of the trailing edge 22 of each segment permits it to be disposed closely adjacent the leading end of a can body as it passes over the axis of the wiper roll 8 and yet permits it to clear said can body end as the can body continues its straight line movement and the segment follows its circular path of movement forwardly and laterally with respect to said can end. It will be noted by reference to Figure 5 of the drawings that when a given can body leading end is disposed over the wiper roll axis a small wedge-shaped clearance 30 will be provided between it and the trailing edge 22 of the respective shielding segment.

It will be observed by reference to Figures 1 and 3 of the drawings that the solder splash shielding disk structure rotates in a horizontal plane which intersects the diameters of the traveling can bodies close to the lower extremities thereof. By thus presenting the shielding segments 19 at very low points in the spaces intervening the traveling cans as the spaces move over the wiping roll 8, spattering of solder particles from the wiper roll into the interiors of the can body is effectively prevented.

In Figure 7 of the drawings there is illustrated a modified form of solder splash shielding disk. In this form of the invention a complete disk 31 is provided, and this disk is arcuate slot-and-screw secured as at 32 upon the carrying head so that the relation of shielding segments projecting radially therefrom can be suitably altered with respect to the spaces intervening the traveling can bodies. Each of these segments 33 includes an enlargement 34 at the leading edge thereof, and each such enlargement is so disposed as to extend into the trailing end of a can body as it is passing over the central portion of the wiper roll 8.

A coniform scraper disk 35 is suitably mounted as at 36 so that the scraping edge portion thereof can be engaged with the wiping surface of the wiper roll 8 for the purpose of scraping solder accumulations therefrom. See Figure 1. It will also be observed by reference to this figure that a splash pan 37 is suitably supported as at 38 upon the frame in position for catching solder bits splashing from the wiper roll 8.

In order to prevent accumulation of solder spattered onto the under faces of the shielding segments 19 from the wiper roll 8, a scraper element 39 is adjustably mounted on the frame, as at 40, in position for engaging the under faces of the segments and scrapping solder therefrom in the manner best illustrated in Figures 1 and 6 of the drawings.

In operation, as the open ended can bodies are rapidly fed along the horn guideway in equidistantly spaced relation, the segments 19 radially projected from the shielding disk will be successively projected through the horn slotway 15, and each will substantially fill one of the spaces intervening the can bodies at a very low point in said space so as to intercept solder particles being thrown off from the rapidly rotating wiper roll 8 and thereby prevent spattering of the solder particles into the interiors of the can bodies.

By making the shield disks adjustable about their axes the blades can be suitably timed with relation to the traveling can bodies, and by making the individual shield segments removable and replaceable, different sizes of segments can be mounted as can bodies of different lengths are being worked upon.

It is of course to be understood that the details of structure and arrangement of parts may be variously changed and modified without departing from the spirit and scope of my invention.

I claim:

1. In apparatus of the character described, a horn along which can bodies having freshly soldered side seams are moved in equidistantly spaced relation, a wiping roll engageable with the can body seams for wiping surplus solder therefrom, and a solder splash shielding disk rotatable in a plane bearing angular relation to the plane in which the wiping roll rotates and including solder splash shielding projections disposed flatwise in said plane and individually movable into spaces intervening can body ends as the spaced can body ends pass over the wiping roll to minimize splashing of solder into said can bodies.

2. In apparatus of the character described, a horn along which can bodies having freshly soldered side seams are moved in equidistantly spaced relation, a wiping roll engageable with the can body seams for wiping surplus solder therefrom, a solder splash shielding disk rotatable in a plane bearing angular relation to the plane in which the wiping roll rotates and including solder splash shielding projections disposed flatwise in said plane and individually movable into spaces intervening can body ends as the spaced can body ends pass over the wiping roll to minimize splashing of solder into said can bodies, a rotary carrier head for said disk, and means for adjustably mounting the disk on said head so that the positions of the projections can be properly correlated with the spaces between the traveling can bodies.

3. In apparatus of the character described, a horn along which can bodies having freshly soldered side seams are moved in equidistantly spaced relation, a wiping roll rotatable about a horizontal axis and engageable with the can body seams for wiping surplus solder therefrom, a rotary splash shielding disk rotatable about a vertical axis and including flat solder splash shielding projections disposed flatwise in the plane of the disk and individually movable into spaces intervening can body ends as the spaced can body ends pass over the wiping roll to minimize splashing of solder into said can bodies, and a scraper element stationarily mounted in position and engageable with flat surfaces of the disk projections for scraping from said disk projections solder splashed thereon from the wiping roll.

4. In apparatus of the character described, a horn along which can bodies having freshly soldered side seams are moved in equidistantly spaced relation, a wiping roll engageable with the can body seams for wiping surplus solder therefrom and rotatable in a vertical plane, and a solder splash shielding disk rotatable in a horizontal plane and including solder splash shielding projections disposed flatwise in the plane of the disk and individually movable into spaces intervening can body ends as the spaced can body ends pass over the wiping roll to minimize splashing of solder into said can bodies, each said projection being so shaped as to present an edge portion parallel the trailing end of a can body as it is passing over the wiping roll.

5. In apparatus of the character described, a horn along which can bodies having freshly soldered side seams are moved in equidistantly spaced relation, a wiping roll engageable with the can body seams for wiping surplus solder therefrom and rotatable in a vertical plane, and a solder splash shielding disk including horizontally disposed solder splash shielding projections individually movable into spaces intervening can body ends as the spaced can body ends pass over the wiping roll to minimize splashing of solder into said can bodies, said disk being rotatable in a horizontal plane intersecting the vertical diameter of the traveling can bodies close to the lower extremities thereof.

6. In apparatus of the character described, a horn along which can bodies having freshly soldered side seams are moved in equidistantly spaced relation, a wiping roll engageable with the can body seams for wiping surplus solder therefrom and rotatable in a vertical plane, and a solder splash shielding disk including horizontally disposed solder splash shielding projections individually movable into spaces intervening can body ends as the spaced can body ends pass over the wiping roll to minimize splashing of solder into said can bodies, said disk being rotatable in a horizontal plane intersecting the vertical diameter of the traveling can bodies close to the lower extremities thereof, and each said projection having edge portions disposed in a generally radial direction with respect to the axis of said disk.

7. In apparatus of the character described, a horn along which can bodies having freshly soldered side seams are moved in equidistantly spaced relation, a wiping roll engageable with the can body seams for wiping surplus solder therefrom and rotatable in a vertical plane, and a solder splash shielding disk rotatable in a horizontal plane and including horizontally disposed solder splash shielding projections individually movable into spaces intervening can body ends as the spaced can body ends pass over the wiping roll to minimize splashing of solder into said can bodies, each said projection being so shaped as to present an edge portion in close proximity behind the trailing end of a can body as it is passing over the wiping roll, and an edge portion in close proximity in advance of the oncoming end of the next succeeding can body as it is passing over the wiping roll.

JAMES H. O'NEIL.